US010866737B2

(12) United States Patent
Ramalingam et al.

(10) Patent No.: US 10,866,737 B2
(45) Date of Patent: Dec. 15, 2020

(54) APPARATUS, METHOD AND SYSTEM TO STORE INFORMATION FOR A SOLID STATE DRIVE

(71) Applicant: Intel Corporation, Santa Clara, CA (US)

(72) Inventors: Anand S. Ramalingam, Beaverton, OR (US); James A. Boyd, Hillsboro, OR (US); Myron Loewen, Loveland, CO (US)

(73) Assignee: Intel Corporation, Santa Clara, CA (US)

( * ) Notice: Subject to any disclaimer, the term of this patent is extended or adjusted under 35 U.S.C. 154(b) by 1038 days.

(21) Appl. No.: 14/857,737

(22) Filed: Sep. 17, 2015

(65) Prior Publication Data

US 2017/0083454 A1 Mar. 23, 2017

(51) Int. Cl.
*G06F 3/06* (2006.01)
*G06F 12/02* (2006.01)

(52) U.S. Cl.
CPC ............ *G06F 3/061* (2013.01); *G06F 3/0656* (2013.01); *G06F 3/0688* (2013.01);
(Continued)

(58) Field of Classification Search
CPC ..... G06F 2212/7201; G06F 2212/2024; G06F 3/061; G06F 3/0614; G06F 3/0617;
(Continued)

(56) References Cited

U.S. PATENT DOCUMENTS 6,728,795 B1 * 4/2004 Farazmandnia ........ G06F 13/28
710/22
7,519,754 B2 * 4/2009 Wang .................. G06F 12/0246
365/189.08
(Continued)

OTHER PUBLICATIONS

E. R. Giles, K. Doshi and P. Varman, "SoftWrAP: A lightweight framework for transactional support of storage class memory," 2015 31st Symposium on Mass Storage Systems and Technologies (MSST), Santa Clara, CA, 2015, pp. 1-14. (Year: 2015).*
(Continued)

*Primary Examiner* — Reginald G Bragdon
*Assistant Examiner* — Aaron D Ho
(74) *Attorney, Agent, or Firm* — Compass IP Law PC (57) ABSTRACT

Techniques and mechanisms for exchanging information between a solid state drive (SSD) and a write-in-place non-volatile memory via a host device. In an embodiment, access control information defines state of the SSD, where the access control information determines and/or is based on an access by the host device to other non-volatile memory of the SSD. The access control information includes address conversion information defining a correspondence of a logical address with a physical address for a location of the other non-volatile memory of the SSD. At least some of the access control information is stored by the SSD to the write-in-place non-volatile memory for later retrieval by the SSD. In another embodiment, the SSD signals that a commit operation is to be performed to flush any cached or buffered access control information into the write-in-place non-volatile memory.

11 Claims, 6 Drawing Sheets

(52) U.S. Cl.
CPC .. *G06F 12/0246* (2013.01); *G06F 2212/7201* (2013.01); *Y02D 10/00* (2018.01)

(58) Field of Classification Search
CPC .... G06F 3/0656; G06F 3/0659; G06F 3/0688; G06F 12/0246; Y02D 10/13
USPC ........................................................ 711/102
See application file for complete search history.

(56) References Cited

U.S. PATENT DOCUMENTS

| | | | | |
|---|---|---|---|---|
| 7,562,189 | B2* | 7/2009 | Hamilton | G06F 17/30067 711/114 |
| 9,390,020 | B2* | 7/2016 | Jannyavula Venkata | G06F 12/0246 |
| 2007/0033432 | A1* | 2/2007 | Pecone | G06F 1/305 714/6.12 |
| 2012/0079171 | A1* | 3/2012 | Ju | G11C 7/1072 711/103 |
| 2013/0346725 | A1* | 12/2013 | Lomet | G06F 16/2246 711/206 |
| 2014/0129761 | A1* | 5/2014 | Kwon | G06F 12/0246 711/103 |
| 2015/0039814 | A1* | 2/2015 | Lim | G06F 12/0246 711/103 |
| 2015/0186278 | A1* | 7/2015 | Jayakumar | G06F 1/3275 711/103 |
| 2015/0324284 | A1* | 11/2015 | Kim | G06F 12/0246 711/103 |
| 2015/0332772 | A1* | 11/2015 | Kim | G11C 16/30 365/185.22 |
| 2016/0342509 | A1* | 11/2016 | Kotte | G06F 12/0246 |

OTHER PUBLICATIONS

Macronix International Co., Ltd., "Booting from NAND Flash Memory", Dec. 12, 2013 (Year: 2013).*
NVM Express, Revision 1.2, Nov. 3, 2014, pp. 11-12 (Year: 2014).*
*Intel, Intel® Architecture Instruction Set Extensions Programming Reference*, Ref# 319433-023, Aug. 2015, 13 pages.

* cited by examiner

APPARATUS, METHOD AND SYSTEM TO STORE INFORMATION FOR A SOLID STATE DRIVE

BACKGROUND

1. Technical Field

Embodiments discussed herein relate generally to computing devices and more particularly, but not exclusively, to operation of a solid state drive.

2. Background Art

Currently, solid state drives (SSD) devices need to store and locally maintain certain internal buffers, registers and other data structures to provide a configuration for properly implementing drive functionality. Address map information, such as an indirection tables, and other configuration information is maintained in internal dynamic random access memory (DRAM), or other volatile memory of an SSD, so that when an input/output (I/O) request is received by the SSD, the request to data transfer to and from non-volatile memory of the SSD can be quickly serviced. However, this information is susceptible to being lost when power is interrupted, and has to be reconstructed—e.g., by a time consuming process commonly referred to as power loss replay.

The storing, maintaining and accessing of configuration information is further complicated by varying operational constraints of the SSD with respect to different types of such information. Firmware image information and memory defect information has to be stored independent of the non-volatile memory in the SSD, used for persistent storage, and each other, as they need to be updated independent of each other. Block based non-volatile memory, such as NAND requires an entire block be erased before writing to the block. In the case of 3 Dimensional (3D) NAND technology, the minimum required size of an erase block is relatively big, as more bits are densely packed and stacked. One result of this large granularity erase operation is that large erase blocks need to be reserved to support what is often referred to as a "transactional" erase capability (where a previous copy of data is retained until a new copy is confirmed to be safely stored). These large allocated erase blocks in turn result in significant amounts of inefficiently used memory capacity.

As successive generations of computer technologies continue to trend toward high power efficiency and quick power up capability, there is expected to be an increased demand for resource-efficient ways to improve access to SSD devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use models in which a solid state drive (SSD) is to exchange access control information with a write-in-place non-volatile memory external to the SSD. Such discussions are exemplary only, and it should be understood that all or a portion of the technologies described herein may be used in other contexts. Indeed the technologies described herein may be used with any suitable SSD device. Those skilled in the relevant art(s) with access to the teachings provided herein will recognize additional modifications, applications, and embodiments within the scope of this disclosure, and additional fields in which embodiments of the present disclosure would be of utility.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any electronic device to which multiple port controllers are configured to access the same physical layer circuitry.

Certain embodiments variously provide techniques and/or mechanisms for enabling access control information to be exchanged between a SSD and an external write-in-place non-volatile memory that is distinct from and coupled to the SSD. As used herein, "access control information" refers to information specifying or otherwise indicating state (e.g., including previous state, current state and/or expected state) of a SSD, where such information may be used by access control logic of the SSD for the servicing of an I/O request. The access control information may include, but is not limited to, a firmware image (or portion thereof), memory map information, address conversion information, one or more configuration parameters, buffered data and/or the like. Access control information may be stored to, and subsequently retrieved from, persistent memory via an interface to a host to configure firmware circuitry, buffers, control hardware or other such circuit logic of the SSD. Access control information may be distinguished, for example, from any I/O request that the SSD services using such access control information.

Memory technology has developed to the point where recently-developed types of non-volatile memory variously provide for write-in-place functionality (as contrasted with read/modify/write functionality, for example), byte addressability, comparatively small write granularities (64 B to 1 KB), high write bandwidth and other such improved performance. Certain embodiments are based on a realization that such non-volatile memory may be adapted for use to store various SSD critical information outside of the SSD— e.g., to provide improved efficient use of SSD resources space along with superior protection and reliability. The term "write-in-place" refers to an ability of a memory to write an updated version of data to the same memory location where an immediately preceding version of the data is already stored (e.g., where the immediately preceding version is written over). Write-in-place memory may allow for the writing of an amount of data without requiring that some larger granularity (e.g., 4×, 8×, etc.) amount of data be erased. In an embodiment, a write-in-place non-volatile memory is a 3 Dimensional (3D) cross point memory device. Other examples of write-in-place non-volatile memory include, but are not limited to, spin-transfer torque magnetic random-access memory (STT-RAM), magnetoresistive random-access memory (MRAM) and phase-change memory (PCM). Write in-place non-volatile memory may provide great simplification in the management of system critical data. For example, such write-in-place functionality may be used, in combination with an instruction commit persistent memory writes, for achieving coherency with transactional updates by the SSD.

Unless otherwise indicated herein, "write-in-place non-volatile memory" is used to refer to a memory that is distinct from (external to) at least some non-volatile memory of a SSD—e.g., where the write-in-place non-volatile memory is coupled to the SSD via an interconnect of a host system. A non-volatile memory of the SSD may serve as a persistent storage—e.g., where such a non-volatile memory is block addressable and/or is to perform writes that are not write-in-place. Certain embodiments are described herein with respect to operation of an SSD including NAND that is coupled to a host via an interconnect conforming to a Peripheral Component Interconnect Express (PCIe) standard, such as that of the PCIe specification, revision 3.0 released November 2010 by the PCI Special Interest Group (PCI-SIG), where the SSD supports access according to an interface standard such as that of the Non-Volatile Memory Express (NVMe) 1.2 specification, released November 2014 by the Non-Volatile Memory Host Controller Interface Working Group. However, such description may be extended to additionally or alternatively apply to any of a variety of other SSDs, interconnects and/or interface standards, according to different embodiments.

Figure 1:
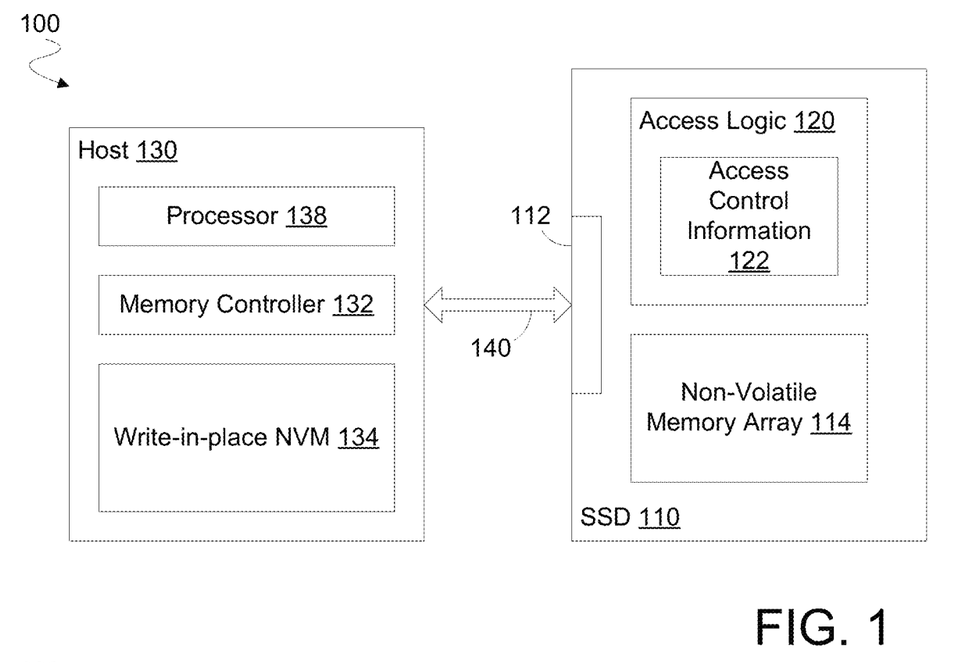
FIG. 1 is a functional block diagram illustrating elements of a system to provide access to a solid state drive according to an embodiment.

FIG. 1 illustrates elements of a system 100 to provide access to a SSD according to an embodiment. System 100 may comprise, for example, a hardware platform of a desktop computer, laptop computer, handheld device (e.g., smart phone, tablet, etc.) or any of a variety of other computing-capable devices.

In the illustrative embodiment shown, system 100 includes a SSD 110, a host 130 and an interconnect 140 coupling host 130 to a hardware interface 112 of SSD 110. SSD 110 may include non-volatile memory array 114—e.g., including NAND devices—and access logic 120 to provide host 130 with access to non-volatile memory array 114. Access logic 120 may include circuitry and/or other logic— e.g., including firmware, address conversion information, command parsing logic, address decode logic, I/O control logic and/or the like—to process input/output (IO) requests that SSD 110 receives from host 130. For example, host 130 may comprise a processor 138 and a memory controller 132, where execution of one or more processes with processor 138 results in memory controller 132 performing IO operations to read data from, and/or write data to, non-volatile memory array 114. In an embodiment, memory controller 132 and processor 138 reside in the same packaged device— e.g., where processor 138 and memory controller 132 are on the same integrated circuit (IC) die. Servicing IO requests from host 130 may include SSD 110 accessing access control information 122 that is included in or coupled to access logic 120.

Certain embodiments extend functionality, such as that provided by NVMe, which allows a SSD device to request use of a dedicated host-side non-volatile memory buffer. One protocol for an SSD to request such a host buffer is provided in NVMe 1.2. In some embodiments, logic of host 110—such as a SSD driver (not shown)—may allocate to SSD 110 at least a portion of write-in-place (WIP) non-volatile memory (NVM) 134 that is included in or coupled to host 130. SSD 110 may then receive and store some or all of access control information 122 for later retrieval from WIP NVM 134. In an embodiment, SSD 110 is configured at least in part by memory map information—received from host 130—that exposes to SSD 110 the portion of WIP NVM 134 and/or a control mechanism for accessing the portion of WIP NVM 134.

Various embodiments are discussed herein with respect to performing a flush operation and/or other access to a write-in-place non-volatile memory. A flush operation commits to persistent memory data that was previously buffered, queued or otherwise provisionally maintained in a memory subsystem. A flush operation may follow an earlier store-to-memory operation that targets an address assigned to persistent (power failure protected) memory, where the subsequent flush operation transfers data from a buffer, queue, etc. to persistent memory, such as a write-in-place non-volatile memory. A request for a flush operation ("Flush operation request" herein) may include, or be in response to, signaling by processor logic, control logic, protocol logic or other circuitry of the SSD. Alternatively or in addition, a direct memory access engine or other agent may generate, or service, a Flush operation request. In some embodiments, a Flush operation request includes (or alternatively, requests) an instruction of a host-side processor—e.g., a PCOMMIT instruction supported by various processors from Intel Corporation of Santa Clara, Calif.

Some embodiments may additionally or alternatively enable similar access to memory resources other than write-in-place non-volatile memory. For example, a virtual machine manager or other virtualization logic may provide configuration information that represents such memory resources to a virtual machine or other such client as being write-in-place non-volatile memory. Such a client may perform operations discussed herein based at least in part on such configuration information.

One or more operational characteristics of WIP NVM 134 may enable SSD 110 to write to host 130 (and retrieve from host 130) types of access control information that, according to conventional techniques, have been restricted to local storage at a SSD device. These types of access control information may now be stored remotely to WIP NVM 134 while allowing for accommodation of operational constraints imposed by SSD 110. In some embodiments, SSD 110, after an initial provisioning of configuration information, no longer needs handshake communications with, and/or presence of, a host-side driver to use WIP NVM 134. Accordingly, SSD 110 may be configured to perform direct memory accesses of WIP NVM 134, where such configuration persists even across power cycles of host 130. For example, host firmware such as basic input/output system (or "BIOS", not shown) executed by processor 138 may enumerate WIP NVM 134 each time the system boots—e.g., where the BIOS memory maps a region of WIP NVM 134 to a specific address range used by memory controller 132. The memory range allocated to SSD 110 may remain the same, for example, until WIP NVM 134 is replaced or reconfigured. In such an embodiment, WIP NVM 134 may be used for improved operation of SSD 110—e.g., until firmware and/or other logic of SSD 110 detects a change to a configuration of WIP NVM 134.

Figure 2:
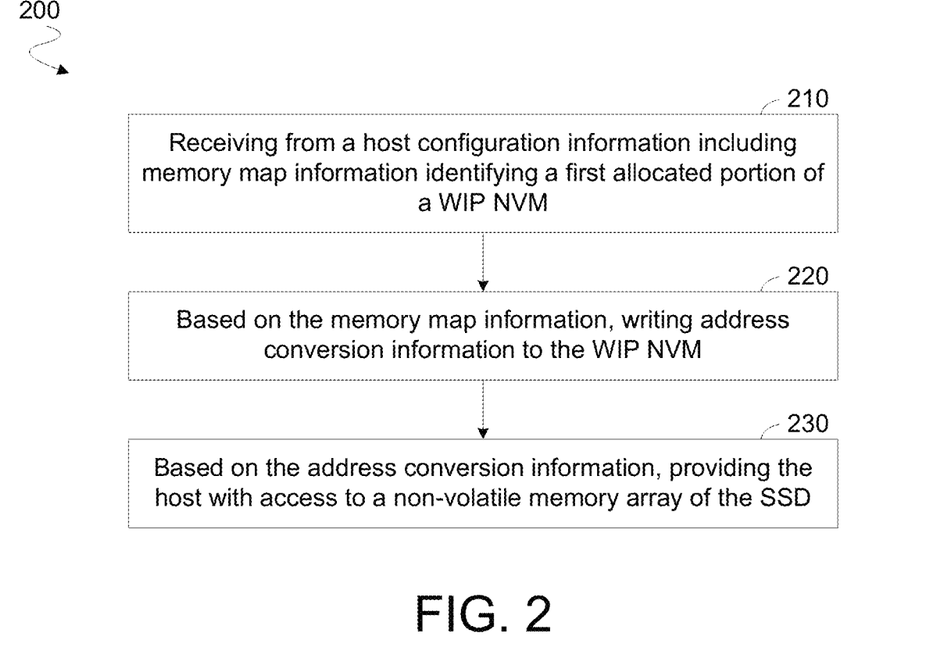
FIG. 2 is a flow diagram illustrating elements of a method for operating a solid state drive according to an embodiment.

FIG. 2 illustrates elements of a method 200 for exchanging access control information with a SSD according to an embodiment. Method 200 may be performed by a SSD including some or all of the features of SSD 110, for example. Method 200 may be performed at a SSD device coupled to a host that includes, or couples to, a write-in-place non-volatile memory that is distinct from at least a block based NVM of the SSD device. A host may include any of various circuitry to participate in an IO exchange with the SSD—e.g., where the host includes a memory controller, a processor or a combination thereof.

In an embodiment, method 200 includes, at 210, receiving configuration information from a host, the configuration information including memory map information identifying a first allocated portion of a write-in-place (WIP) non-volatile memory (NVM) of the host. The first portion of write-in-place non-volatile memory may be allocated to the SSD during system boot-up or other initialization process. The write-in-place non-volatile memory may include byte-addressable memory, for example.

Based on the memory map information received at 210, method 200 may, at 220, write address conversion information to the write-in-place non-volatile memory, the address conversion information identifying a correspondence of a logical address to a physical address associated with a first location of the non-volatile memory array. The address conversion information may include, for example, one or more address map tables, indirection tables, translation tables, address pointers or other such data structures—e.g., where the information may be used to perform physical-to-logical address conversion, logical-to-logical address conversion and/or logical-to-physical address conversion.

Based on the address conversion information written to write-in-place non-volatile memory at 220, method 200 may, at 230, provide the host with access to a non-volatile memory array of the SSD. In an embodiment, providing the access at 230 includes the SSD retrieving at least some access control information from the write-in-place non-volatile memory and servicing an IO request from a host memory controller based on the retrieved access control information. For example, the SSD may further perform a direct memory access of the write-in-place non-volatile memory, the direct memory access to exchange at least a portion of the address conversion information. In one embodiment, the DMA engine automatically retrieves such address conversion information from the write-in-place non-volatile memory in response to initialization of the SSD after power up of the SSD. Alternatively or in addition, providing the access at 230 may be based on some access control information which is not retrieved from write-in-place non-volatile memory, although a backup copy of such access control information is available at the write-in-place non-volatile memory.

In some embodiments, method 200 further comprises operations (not shown) to assure that access control information is stored at write-in-place non-volatile memory—e.g., rather than at some volatile cache, buffer or other host-side structure. By way of illustration and not limitation, method 200 may include the SSD further signaling, based on the configuration information received at 210, that a flush operation is to be performed. In response to a Flush operation request, some portion of address conversion information may be flushed to the write-in-place non-volatile memory from a cacheline, buffer or other repository of the host—e.g., where the repository would not otherwise maintain the information persistently in the event of power interruption. The configuration information received at 210 may include information identifying, for example, an address of one or more control registers of the host, wherein the Flush operation request is to write to one or more control register bits of the host to signal that at least a portion of the address conversion information is to be flushed to the write-in-place non-volatile memory. The Flush operation request may be generated, for example, by a direct memory access (DMA) engine of the SSD. Direct memory access (DMA) is one example of a technology that relies upon volatile buffers, for example. A Flush operation request according to one embodiment may be used to ensure that data targeted by a DMA request has been written from the volatile buffer(s) to write-in-place nonvolatile memory. Alternatively or in addition, other access control logic of the SSD may signal to a processor or other host-side logic that a Flush operation request is to be generated at the host on behalf of the SSD.

Additional or alternative access control information—e.g., other than address conversion information—may be exchanged by method 200 between the SSD and the write-in-place non-volatile memory, according to different embodiments. By way of illustration and not limitation, such access control information may include at least a portion of a firmware image that the SSD executes to provide the host with access to the non-volatile memory array. In some embodiments, the access control information identifies respective values of one or more configurable parameters—e.g., where the parameters are specific to a particular version of such a firmware image. Access control information may additionally or alternatively identify one or more defective locations of the non-volatile memory array—e.g., where the SSD selectively avoids storing data to such locations based on the defect information. In some embodiments, access control information includes transitory data stored in transfer buffers, counters, decoders and/or other access control logic during runtime operation of the SSD.

Figure 3:
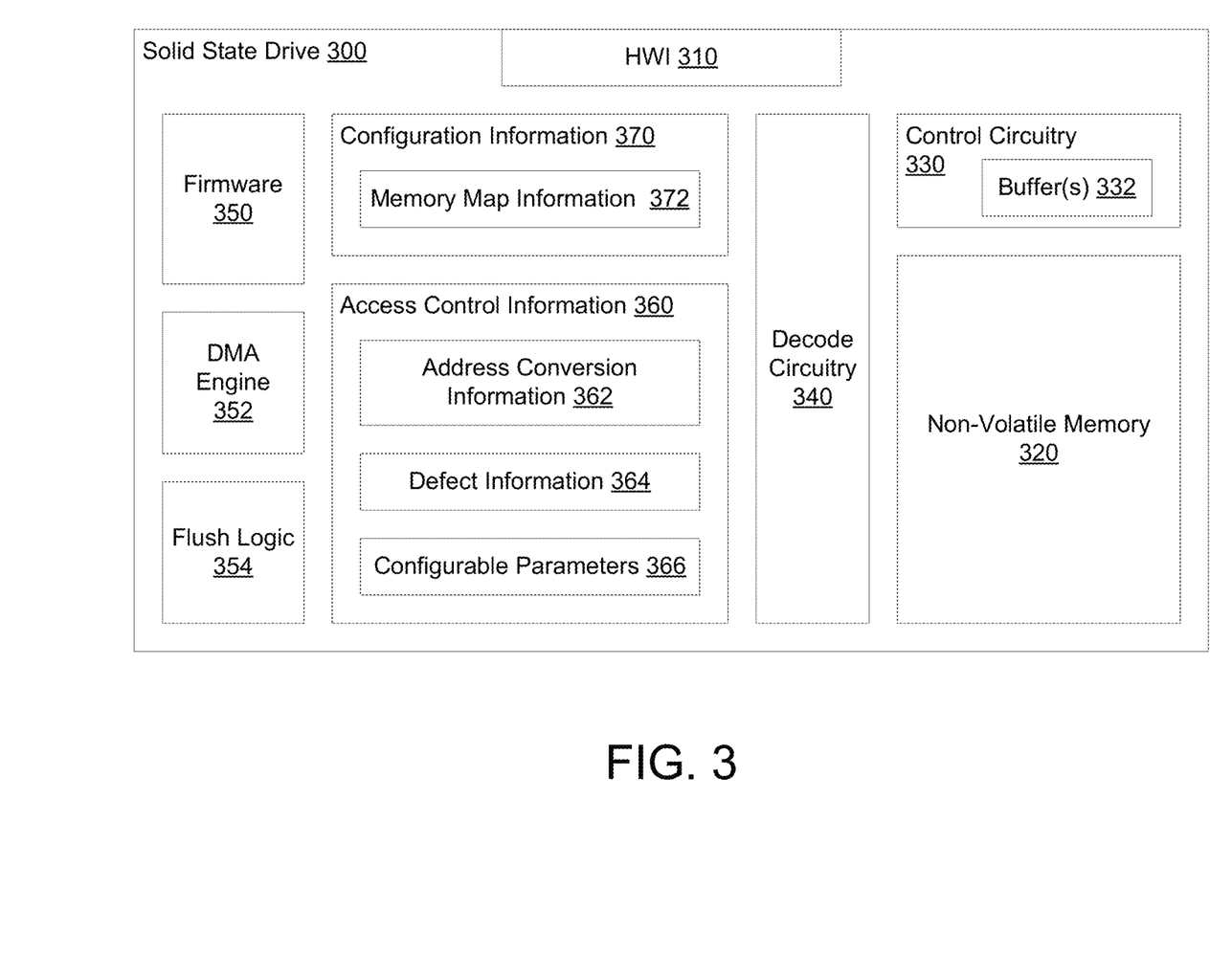
FIG. 3 is a functional block diagram illustrating elements of a solid state drive according to an embodiment.

FIG. 3 illustrates elements of a SSD 300 to exchange access control information with a write-in-place non-volatile memory of a host according to an embodiment. SSD 300 may include some or all of the features of SSD 110, for example. In one embodiment, logic of SSD 300 is configured to perform operations such as those of method 200.

SSD 300 may include non-volatile memory 320—e.g., including NAND memory—and a hardware interface HWI 310 to couple SSD 300 to a host (not shown). Access control logic of SSD 300 may provide the host with IO (and/or other) access to non-volatile memory 320. By way of illustration and not limitation, such access control logic may include decode circuitry 340 to parse IO requests from the host, as well as control circuitry 330 to implement access to non-volatile memory 320 based on the parsed IO requests and to regulate signaling (e.g., in the case of a read access) between non-volatile memory 320 and HWI 310. The respective functionality of decode circuitry 340 and control circuitry 330 may be adapted at least in part from conventional SSD access mechanisms and techniques, which are not detailed herein and are not limiting on some embodiments. Access control logic may further comprise firmware 350 to provide for interaction with a SSD driver or other such host-side process. Firmware 350 may include non-volatile memory that, for example, is dedicated to store instructions of firmware code. In an embodiment, firmware 350 supports an interface for configuration of SSD 300 by the host. Such an interface may be compatible, for example, with an NVMe standard—e.g., where HWI 310 couples to a PCIe bus (not shown) that is included in or coupled to the host.

Access control logic of SSD 300 may variously include, couple to, operate based on and/or determine access control information (e.g., including the illustrative access control information 360), some or all of which SSD 300 may be copied, at some point, to a write-in-place non-volatile memory of the host. In an embodiment, SSD 300 receives from the host configuration information 370 for configuring SSD 300 to enable storage of at least some of access control information 360 (or other such information) to the write-in-place non-volatile memory of the host. A person of ordinary skill in the relevant art, and having the benefit of the disclosure herein, will appreciate that SSD 300 may include other access control information—e.g., in addition to and/or instead of some or all access control information 360—according to different embodiments.

Configuration information 370 may include memory map information 372 indicating an allocated portion of write-in-place non-volatile memory. Based on memory map information 372, SSD 300 may copy some or all of access control information 360—e.g., including address conversion information 362—to the write-in-place non-volatile memory. One or more changes to access control information 360 at SSD 300 may be further registered by updating a version thereof in the write-in-place non-volatile memory. As a result, a state of address conversion information 362 (and/or other access control information) during a pervious power session may be available from the write-in-place non-volatile memory in a coherent fashion during the next power session. This enables significantly improved responsiveness in bringing SSD 300 online during a system power up or other such power state transition.

Certain embodiments variously provided for SSD 300 to issue a Flush operation request to assure that, for at least some access control information sent from SSD 300 to the host, information is in fact stored to write-in-place non-volatile memory that, for example, is distinct from SSD 300 and is included in or coupled to the host. In one embodiment, a Flush operation request flushes into the write-in-place non-volatile memory any such information that may be stored in a host-side buffer, cache line or other intermediate (and volatile) repository of the host. Flush logic 354 represents one example of hardware, firmware and/or other such logic of SSD 300 to issue such a Flush operation request.

Some embodiments provide a mechanism for exposing functionality to enable a Flush operation on behalf of SSD 300 that does not require interaction with a central processing unit (CPU) of the host. For example, a memory controller included in or coupled to the host processor may expose to SSD 300 a memory mapped control region that has been allocated to SSD 300 for performing a direct memory access (DMA) implementation of a Flush operation. In the illustrative embodiment shown, memory map information 372 may identify a control region for use in accessing write-in-place non-volatile memory. Firmware and/or other logic of SSD 300 may be configured to operate—e.g., as a DMA engine 352—to write to such a control region. In one illustrative embodiment, memory map information 372 specifies a control register of the host, where one or more bits of the control register aid in invocation of a Flush operation by DMA. Based on such information, Flush logic 354 may write to the one or more bits a predefined value. A resulting Flush operation may then be performed—e.g., after one or more previous DMA (or other) transactions send access control information to the host—to assure that access control information has been flushed into write-in-place non-volatile memory. Although shown as being a distinct functional block, Flush logic 354 may be an element of DMA engine 352, of firmware 350 or other logic of SSD 300.

In one embodiment, performance of a Flush operation further comprises automatically reading content that was just written to the write-in-place non-volatile memory. For example, a DMA engine (or other agent) may detect a read/write collision and, in response, automatically signal a Flush operation to offload, from volatile buffer resources to a write-in-place non-volatile memory, data that corresponds to the collision. The offloaded data may then be automatically read from the write-in-place non-volatile memory—e.g., to a DMA buffer, the SSD or other location.

In some embodiments, SSD 300 is configured to retrieve information (e.g., some or all of access control information 360) previously stored to the write-in-place non-volatile memory. Such retrieval may be performed automatically, for example, in response to a power state transition such as a power up event, wake up event or the like. Upon a system power up, a host-side basic input/output system (BIOS) or other such logic may initialize a host memory controller and map the write-in-place non-volatile memory. SSD 300 may internally verify availability of the write-in-place non-volatile memory—e.g., by reading from the write-in-place non-volatile memory signature data that confirms the presence of the write-in-place non-volatile memory. In response, SSD 300 may automatically load some or all of access control information 360 (or other such information).

By way of illustration and not limitation, SSD 300 may store and subsequently retrieve from write-in-place non-volatile memory a version of address conversion information 362, such as an indirection table, address translation table or the like. If write-in-place non-volatile memory presence cannot be detected within a time-out period, for example, SSD 300 may instead perform a power loss replay algorithm—e.g., according to conventional techniques. In some embodiments, SSD 300 at least initially foregoes retrieving address conversion information 362, as well as foregoing a power loss replay. SSD 300 may instead provide to a host memory controller a status to indicate that SSD 300 is ready for non-volatile memory I/O access. Since SSD 300 can regenerate address conversion information 360 (e.g., an indirection table, translation table, etc.) it may remain functional and readable even in the event of separation of SSD 300 from the host platform or removal of the write-in-place non-volatile memory from the host platform. In some embodiments some or all portions of the write-in-place non-volatile memory that are allocated to SSD 300 are configured for operation in a write through mode—e.g., where anytime a logical-to-physical (L2P) translation table and/or other access control information in write-in-place non-volatile memory is updated, it is further written back automatically to update SSD 300.

In some embodiments, access control information 360 additionally or alternatively comprises defect information 364 specifying or otherwise indicating the location of regions in non-volatile memory 320 that are defective. For example, NAND-based SSDs experience wear that causes memory cell defects during their lifetime. Often when defective memory cells are detected, they are permanently registered to prevent future use in storing data. A total size of defect information 364 may be small enough to allow for the write-in-place non-volatile memory to efficiently store only one copy thereof.

Alternatively or in addition, access control information 360 may comprise configuration parameters 366 including values for one or more parameters that, for example, are associated with firmware 350. NAND-based SSDs often have configurable parameters and/or other internal variables that are provided with initial default values and that can be modified during SSD configuration. Some or all such parameters/variables may be specific to a firmware image and/or may change between firmware revisions. Runtime updates to a version of configuration parameters 366 in write-in-place non-volatile memory may occur in-place—e.g., where the write-in-place non-volatile memory stores only one version of configuration parameters 366.

In some embodiments, access control information 360 includes a version of transitory data in one or more data structures (such as the illustrative one or more buffers 332 of control circuitry 330). Some NAND SSDs provide a write buffer capability, where upon power loss, the content and state of this transfer buffer is saved to volatile memory which is coupled to capacitive circuitry to provide extended energy to save the transfer buffer content. Certain embodiments store a version of such transfer buffer data to write-in-place non-volatile memory as well (or instead).

In some embodiments, access control information exchanged between SSD 300 and host-side write-in-place non-volatile memory includes an image of some or all of instructions of firmware 350. For example, SSDs typically require an ability to update firmware in the field. Functionality such as that of NVMe may allow a host to update a SSD with small portions of firmware at a time—e.g., the portions variously provided to the SSD via a PCIe connection and a host interface—and then provide a final transactional command after all pieces of the firmware image has been downloaded. Should this final command not arrive before a reset or a power cycle event, the downloaded portions of the firmware image must be discarded. Since firmware image data is often hundreds of kilobytes in size, a host-side write-in-place non-volatile memory may be configured to concurrently store multiple different versions of firmware information—e.g., where writing a copy of an updated firmware version to write-in-place non-volatile memory of the host includes writing over one of many different versions concurrently stored in the write-in-place non-volatile memory.

Figure 4:
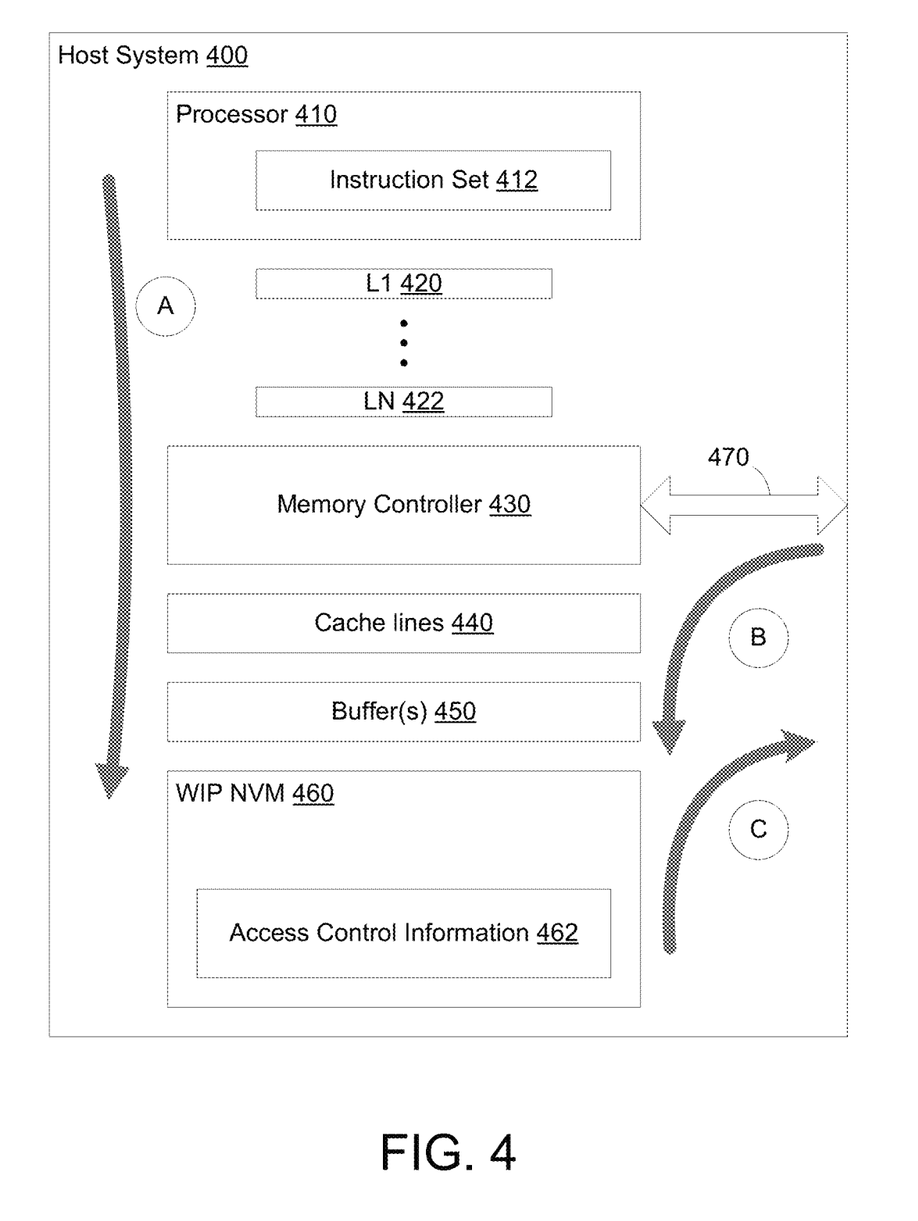
FIG. 4 is a functional block diagram illustrating elements of a host system to participate in an exchange with a solid state drive according to an embodiment.

FIG. 4 illustrates elements of a host system 400 to couple to, and exchange access control information with, a SSD according to an embodiment. Host system 400 may include some or all of the features of host 130, for example. In an embodiment, host system 400 is to participate in one or more exchanges with a SSD that performs operations of method 200.

Host system 400 may include one or more processors, as represented by the illustrative processor 410, to execute a host operating system (OS) and/or any of a variety of other software processes. Execution of a process by processor 410 may result in a memory controller 430 of host system 400 receiving read requests, write requests and/or other messages that, for example, are generated based on an instruction set 412 supported by processor 410. Such messages may request access to non-volatile memory of a SSD (not shown) that is coupled to host system 400 via one or more buses, as represented by the illustrative interconnect 470. Although certain embodiments are not limited in this regard, processor 410 may variously cache data provided by memory controller 430—e.g., using a multi-level cache such as one including the illustrative caches L1 420, . . . , LN 422.

The SSD coupled to host system 400 may be allocated at least some portion of a write-in-place (WIP) non-volatile memory (NVM) 460 (e.g., write-in-place non-volatile memory 134) that, according to one embodiment, the SSD uses for storing and retrieving access control information 462. Recent generations of persistent memories provide functionality that may be variously adapted, according to some embodiments, to accommodate operational requirements of an SSD for improved utilization of various types of access control information. For example, such memory technologies can support, in addition to a write-in-place capability, power fail-safe atomic (e.g., 4 KB) writes wherein new data is guaranteed to be written even when unexpected power loss begins while a write is in progress. As compared with older types of block based non-volatile memory, these write-in-place non-volatile memory devices frequently provide smaller write granularity (e.g., 64 B to 1 KB), smaller write times (e.g., <1 uSec) and/or higher endurance and reliability—e.g., allowing for over 100K access cycles and, in some embodiments, over 1 million access cycles. Such characteristics variously enable adaptation of write-in-place non-volatile memory to support a transactional update of access control information that is exchanged between the write-in-place non-volatile memory and a SSD.

In an embodiment, processor 410 executes firmware, for example, BIOS to detect presence of circuit logic that is included in or coupled to host system 400—e.g., where the BIOS detects that a SSD (not shown) is coupled to host system 400 via one or more buses, as represented by the illustrative interconnect 470. Configuration of the detected SSD may include sending to the SSD configuration information including memory map information that indicates at least some allocated portion of WIP NVM 460 and/or a control mechanism to access such a portion. Based on such memory map information, the SSD may store access control information 462 such as one or more copies of information in one or more buffers 332, firmware 350, access control information 360 and/or the like.

In order to avoid a processor having to signal a read, modify, write operation every time data storage is to be performed, memory controllers typically cache data in a volatile memory line cache buffer. In the illustrative example of host system 400, caches L1 420, . . . , LN 422 are in addition to cache lines 440 and one or more buffers 450, which are coupled between memory controller 430 and WIP NVM 460. Certain embodiments variously provide a Flush operation request to assure that, for at least some access control information, any of the information that currently resides in cache lines 440, one or more buffers 450 or other such host-side volatile repository is flushed into WIP NVM 460 for storage. In one embodiment, a Flush operation request is to assure a write into WIP NVM 460 any data stored in host-side buffers, cache lines or other volatile repositories that are allocated to the SSD. As shown in FIG. 4, a Flush operation request exchange B may be performed by DMA logic of the SSD, where processor 410 does not need to be directly involved. In some embodiments, a Flush operation request is supported by instruction set 412, where a Flush operation request exchange A initiated by processor 410 also flushes L1 420, . . . , LN 422. Some or all of WIP NVM 460 may be configured for operation in a write through mode—e.g., where Flush operation request exchange B or Flush operation request exchange A automatically results an exchange C to write access control information 462 back to the SSD.

Figure 5:
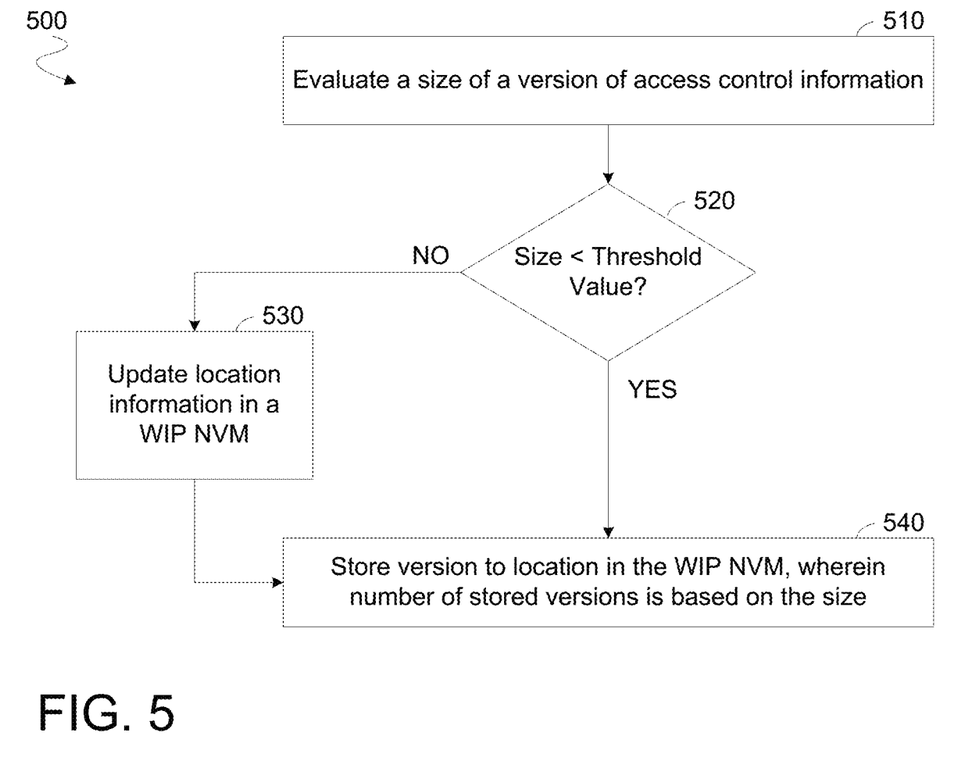
FIG. 5 is a flow diagram illustrating elements of a method for exchanging access control information of a solid state drive according to an embodiment.

FIG. 5 illustrates elements of a method 500, according to an embodiment, for storing a version of access control information of a SSD to a host. Method 500 may be performed by SSD 110, SSD 300 or any of various other such devices. Method 500 may include operations to store at least some of access control logic 462, for example.

Method 500 is just one example of a method including performing, at 510, an evaluation of a size of a version (e.g., a copy) of some access control information, and, at 540, storing the version to a location of the write-in-place non-volatile memory, where a total number of versions of the access control information (the versions each stored to the write-in-place non-volatile memory) is based on the size. By way of illustration and not limitation, a single copy—i.e., only one copy—of some set of access control information may be stored to write-in-place non-volatile memory based on an indication that the size of the set is below (in some embodiments, at or below) some threshold data amount—e.g., 4 KB. In such an embodiment, a pre-defined physical location in write-in-place non-volatile memory may be assigned to storing the copy of the set of access control information. Any updates to that version of the set of access control information may include overwriting a previous version in the pre-defined physical location with later version. Where the write-in-place non-volatile memory supports a power fail safe atomic write, the updates may assure that the location always contains the latest copy of the information. Since conventional non-volatile memory types impose transactional erase requirement, the ability to store and update a given amount of data previously required allocation of twice that amount in memory space. By contrast, write-in-place non-volatile memory that supports write-in-place functionality has half the allocation requirements.

Alternatively or in addition, two (or more) different versions of some other set of access control information may be concurrently stored in different physical locations of the write-in-place non-volatile memory—e.g., based on an indication that the set is above (in some embodiments, at or above) a threshold data amount. In such an embodiment, writing an updated version of the set to write-in-place non-volatile memory may include writing over a version other than the most recent version already stored in write-in-place non-volatile memory. Such updating may further include updating a pointer or other information identifying a location of the most recently written version of the set.

In the illustrative embodiment shown, method 500 determines, at 520, whether the size of the access control information is below some a priori threshold size value—e.g., 4 KB. The storing of any version of some particular set of access control information to the write-in-place non-volatile memory may, due to the size of that set, be limited to only storing one such version at a time to a predetermined location. Therefore, where the size is determined at 520 to be less than the threshold value, the storing at 540 may include overwriting the only previously written version of the set that is stored in write-in-place non-volatile memory.

Where it is determined at 520 that the size of the version is above the threshold value, the storing at 540 may include writing to one of multiple locations of the write-in-place non-volatile storage, the multiple locations each storing a respective version of the access control information. In such a case, method 500 may further comprise, at 530, updating in the write-in-place non-volatile memory location information that identifies, of the multiple locations, the location that stores the version written (or to be written) during the most recent performance of the storing 540.

Figure 6:
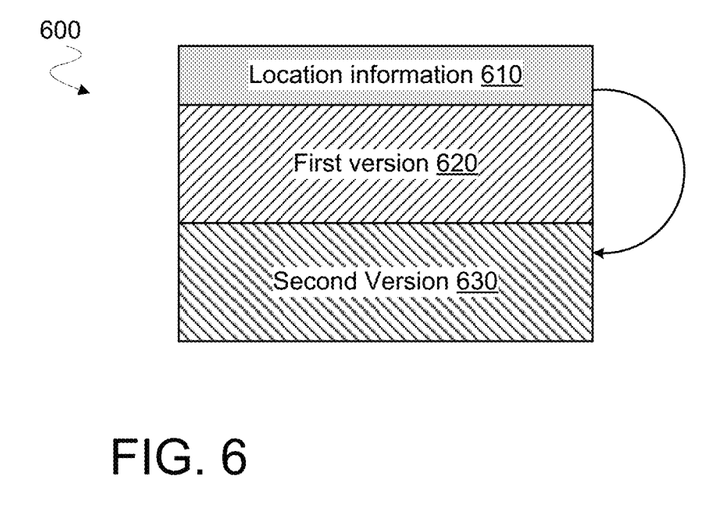
FIG. 6 is a data diagram illustrating elements of access control information stored to a write-in-place non-volatile memory according to an embodiment.

The updating at 530 may include replacing an indication of a second location of the multiple locations with an indication of the location to which access information is stored at 540. For example, FIG. 6 shows a portion 600 of write-in-place non-volatile memory in a host, the portion 600 allocated to a SSD that is coupled to the host. The write-in-place non-volatile memory may be configured to allow for concurrent storage of multiple (e.g., different) versions some access control information. Accordingly, portion 600 may include a first version 620 of access control information (e.g., at least a portion of a firmware image) that is provided by the SSD. Subsequently, a more up-to-date second version 630 may be written to another location of portion 600, where first version 620 and second version 630 are stored concurrently. Location information 610 of portion 600 may be updated—e.g., at 530—to transition from identifying first version 620 to instead identifying second version 630 as a most recent version of the access control information. This may enable a ping-pong mechanism for transactional erase at the write-in-place non-volatile memory.

Figure 7:
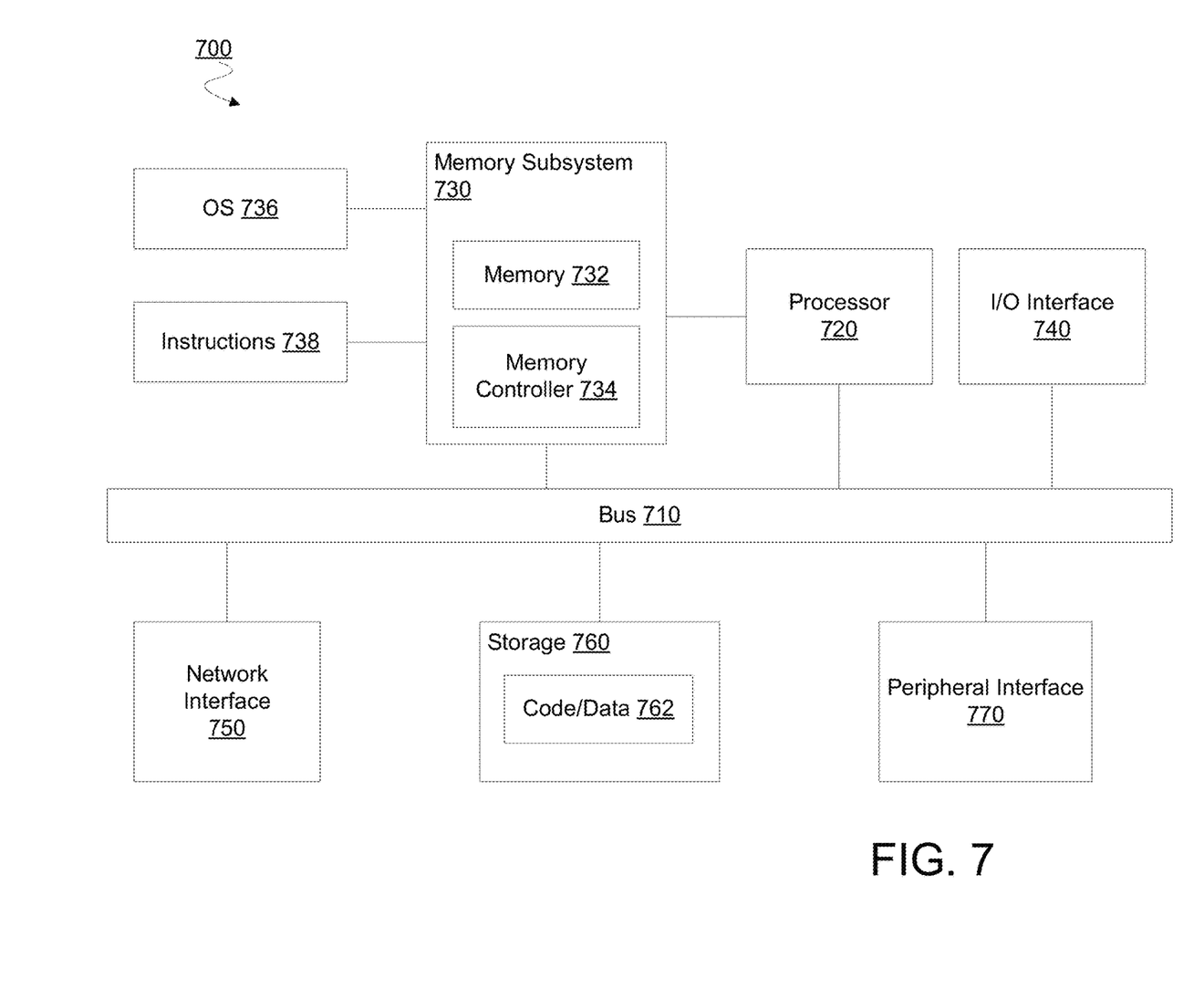
FIG. 7 is a functional block diagram illustrating elements of a computer system according to an embodiment.

FIG. 7 is a block diagram of an embodiment of a computing system in which operation of a solid state drive may be implemented. System 700 represents a computing device in accordance with any embodiment described herein, and may be a laptop computer, a desktop computer, a server, a gaming or entertainment control system, a scanner, copier, printer, or other electronic device. System 700 may include processor 720, which provides processing, operation management, and execution of instructions for system 700. Processor 720 may include any type of microprocessor, central processing unit (CPU), processing core, or other processing hardware to provide processing for system 700. Processor 720 controls the overall operation of system 700, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 may include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720.

Memory subsystem 730 may include memory device 732 where it stores data, instructions, programs, or other items. In one embodiment, memory subsystem includes memory controller 734 which provides mechanisms for providing access to memory device 732. In one embodiment, memory controller 734 provides commands to memory device 732. The commands may be for memory device 732 to access data—e.g., on behalf of processor 720.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 may also correspond to interfaces in network interface 750.

System 700 may also include one or more input/output (I/O) interface(s) 740, network interface 750, one or more internal mass storage device(s) 760, and peripheral interface 770 coupled to bus 710. I/O interface 740 may include one or more interface components through which a user interacts with system 700 (e.g., video, audio, and/or alphanumeric interfacing). Network interface 750 provides system 700 the ability to communicate with remote devices (e.g., servers, other computing devices) over one or more networks. Network interface 750 may include an Ethernet adapter, wireless interconnection components, USB (universal serial bus), or other wired or wireless standards-based or proprietary interfaces.

Storage 760 may be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 may be generically considered to be a "memory," although memory 730 is the executing or operating memory to provide instructions to processor 720. Whereas storage 760 is nonvolatile, memory 730 may include volatile memory (i.e., the value or state of the data is indeterminate if power is interrupted to system 700). In one embodiment, storage 760 includes a solid state drive that is to store access control information to a persistent memory region (e.g., in memory 732) of memory subsystem 730.

Peripheral interface 770 may include any hardware interface not specifically mentioned above. Peripherals refer generally to devices that connect dependently to system 700. A dependent connection is one where system 700 provides the software and/or hardware platform on which operation executes, and with which a user interacts.

Figure 8:
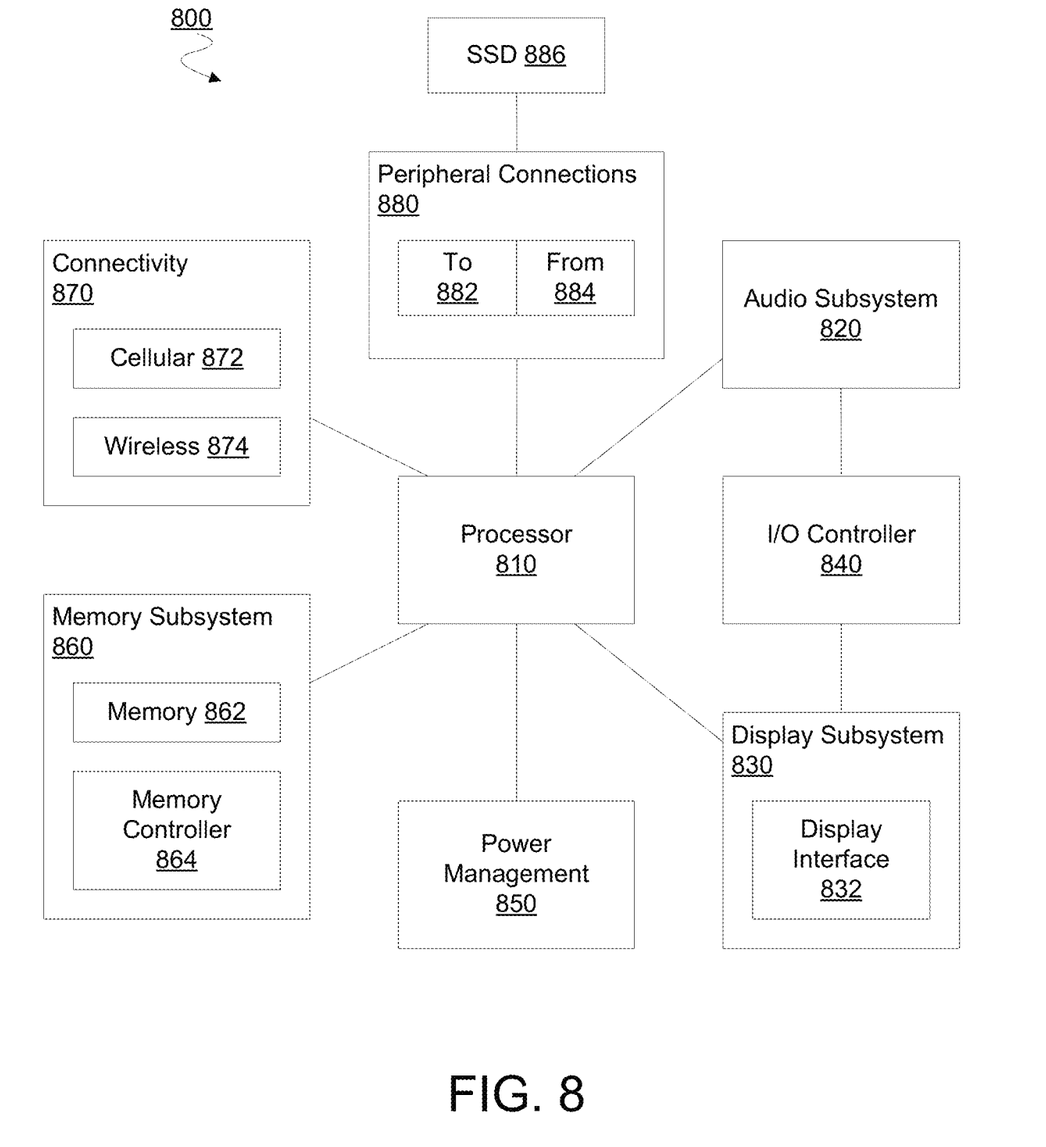
FIG. 8 is a functional block diagram illustrating elements of a mobile device according to an embodiment.

FIG. 8 is a block diagram of an embodiment of a mobile device in which operation of a solid state drive may be implemented. Device 800 represents a mobile computing device, such as a computing tablet, a mobile phone or smartphone, a wireless-enabled e-reader, or other mobile device. It will be understood that certain of the components are shown generally, and not all components of such a device are shown in device 800.

Device 800 may include processor 810, which performs the primary processing operations of device 800. Processor 810 may include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations may also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 may include display interface 832, which may include the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user.

I/O controller 840 represents hardware devices and software components related to interaction with a user. I/O controller 840 may operate to manage hardware that is part of audio subsystem 820 and/or display subsystem 830. Additionally, I/O controller 840 illustrates a connection point for additional devices that connect to device 800 through which a user might interact with the system. For example, devices that may be attached to device 800 might include microphone devices, speaker or stereo systems, video systems or other display device, keyboard or keypad devices, or other I/O devices for use with specific applications such as card readers or other devices.

As mentioned above, I/O controller 840 may interact with audio subsystem 820 and/or display subsystem 830. For example, input through a microphone or other audio device may provide input or commands for one or more applications or functions of device 800. Additionally, audio output may be provided instead of or in addition to display output. In another example, if display subsystem includes a touchscreen, the display device also acts as an input device, which may be at least partially managed by I/O controller 840. There may also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that may be included in device 800. The input may be part of direct user interaction, as well as providing environmental input to the system to influence its operations (such as filtering for noise, adjusting displays for brightness detection, applying a flash for a camera, or other features).

In one embodiment, device 800 includes power management 850 that manages battery power usage, charging of the battery, and features related to power saving operation. Memory subsystem 860 may include memory device(s) 862 for storing information in device 800. Memory subsystem 860 may include nonvolatile (state does not change if power to the memory device is interrupted) and/or volatile (state is indeterminate if power to the memory device is interrupted) memory devices. Memory 860 may store application data, user data, music, photos, documents, or other data, as well as system data (whether long-term or temporary) related to the execution of the applications and functions of system 800.

In one embodiment, memory subsystem 860 includes memory controller 864 (which could also be considered part of the control of system 800, and could potentially be considered part of processor 810). Memory controller 864 monitors performance of memory 862. For example, memory controller 864 may issue a command for memory 862 to access data—e.g., on behalf of processor 810.

Connectivity 870 may include hardware devices (e.g., wireless and/or wired connectors and communication hardware) and software components (e.g., drivers, protocol stacks) to enable device 800 to communicate with external devices. The device could be separate devices, such as other computing devices, wireless access points or base stations, as well as peripherals such as headsets, printers, or other devices.

Connectivity 870 may include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and may include personal area networks (such as Bluetooth), local area networks (such as WiFi), and/or wide area networks (such as WiMax), or other wireless communication. Wireless communication refers to transfer of data through the use or modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. In one embodiment, peripheral connections 880 couple to a solid state drive 886 that is to store access control information to a persistent memory region of memory 862—e.g., according to techniques discussed herein. Device 800 commonly has a "docking" connector to connect to other computing devices for purposes such as managing (e.g., downloading and/or uploading, changing, synchronizing) content on device 800. Additionally, a docking connector may allow device 800 to connect to certain peripherals that allow device 800 to control content output, for example, to audiovisual or other systems.

In addition to a proprietary docking connector or other proprietary connection hardware, device 800 may make peripheral connections 880 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a solid state drive (SSD) device comprises a hardware interface to couple the SSD to a host including a memory controller, a non-volatile memory array, and access logic. The access logic includes first circuitry configured to receive from the host configuration information including memory map information identifying a portion of a write-in-place non-volatile memory of the host, the portion allocated to the SSD. The access logic further includes second circuitry configured to write address conversion information to the write-in-place non-volatile memory based on the memory map information, the address conversion information identifying a correspondence of a logical address to a physical address associated with a first location of the non-volatile memory array, wherein the access logic to provide the host with access to the non-volatile memory array based on the address conversion information.

In an embodiment, based on the configuration information, the access logic is further to signal that a flush operation request is to be generated, wherein, in response to the flush operation request, at least a portion of the address conversion information is flushed to the write-in-place non-volatile memory from a cacheline or a buffer. In another embodiment, the access logic includes a direct memory access (DMA) engine to generate the flush operation request. In another embodiment, the access logic to signal that the flush operation request is to be generated includes the access logic to signal a processor of the host to issue a PCOMMIT command. In another embodiment, the access logic includes a direct memory access (DMA) engine to perform a direct memory access of the write-in-place non-volatile memory, the direct memory access to exchange at least a portion of the address conversion information. In another embodiment, the DMA engine is further to automatically retrieve the address conversion information from the persistent store in response to a power up of the SSD. In another embodiment, the write-in-place non-volatile memory includes a byte-addressable memory region. In another embodiment, the write-in-place non-volatile memory supports a write-in-place functionality.

In another embodiment, the access logic to provide the host with the access to the non-volatile memory array includes the access logic to execute firmware, wherein the access logic is further to exchange with the persistent storage at least a portion of an image of the firmware. In another embodiment, the access logic is further to exchange with the persistent storage information identifying one or more defective locations of the non-volatile memory array. In another embodiment, the access logic is to provide the host with the access to the non-volatile memory array includes the access logic to execute firmware, wherein the access logic is further to exchange with the persistent storage information identifying respective values of one or more configurable parameters specific to a version of the firmware. In another embodiment, the access logic further comprises one or more transfer buffers, wherein the access logic is further to exchange with the persistent storage data stored by the one or more transfer buffers. In another embodiment, the access logic is to perform an evaluation of a size of a first version of access control information, wherein the access logic includes a direct memory access (DMA) engine to write the first version to a first location of the persistent storage, wherein, where the size of the first version is below the threshold size, storage of any version of the access control information to the write-in-place non-volatile memory includes storage to the first location, and where the size of the first version is above the threshold size, the first location is one of multiple locations of the persistent storage each to store a respective version of the access control information, and the DMA engine is to further update location information of the persistent storage, including the DMA engine to replace an indication of a second location of the multiple locations with an indication of the first location.

In another implementation, a method, at a solid state drive (SSD) coupled to a host, comprises receiving configuration information from a host including a memory controller, the configuration information including memory map information identifying a portion of a write-in-place non-volatile memory of the host, the portion allocated to the SSD, based on the memory map information, writing address conversion information to the write-in-place non-volatile memory, the address conversion information identifying a correspondence of a logical address to a physical address associated with a first location of the non-volatile memory array, and based on the address conversion information, providing the host with access to a non-volatile memory array of the SSD.

In an embodiment, the method further comprises, based on the configuration information, signaling that a flush operation request is to be generated, wherein, in response to the flush operation request, at least a portion of the address conversion information is flushed to the write-in-place non-volatile memory from a cacheline or a buffer. In another embodiment, a direct memory access (DMA) engine of the SSD generates the flush operation request. In another embodiment, signaling that the flush operation request is to be generated includes the SSD signaling a processor of the host to issue a PCOMMIT command. In another embodiment, a direct memory access (DMA) engine of the SSD performs a direct memory access of the write-in-place non-volatile memory, the direct memory access to exchange at least a portion of the address conversion information. In another embodiment, the method further comprises, with the DMA engine, automatically retrieving the address conversion information from the persistent store in response to a power up of the SSD. In another embodiment, the write-in-place non-volatile memory includes a byte-addressable memory region. In another embodiment, the write-in-place non-volatile memory supports a write-in-place functionality.

In another embodiment, providing the host with access to the non-volatile memory array includes executing firmware at the SSD, the method further comprises exchanging with the persistent storage at least a portion of an image of the firmware. In another embodiment, the method further comprises exchanging with the persistent storage information identifying one or more defective locations of the non-volatile memory array. In another embodiment, providing the host with access to the non-volatile memory array includes executing firmware at the SSD, the method further comprises exchanging with the persistent storage information identifying respective values of one or more configurable parameters specific to a version of the firmware. In another embodiment, the method further comprises exchanging with the persistent storage data stored by one or more transfer buffers of the SSD. In another embodiment, the method further comprises performing an evaluation of a size of a first version of access control information, and with a direct memory access (DMA) of the SSD, writing the first version to a first location of the persistent storage, wherein, where the size of the first version is below the threshold size, storing of any version of the access control information to the write-in-place non-volatile memory includes storing to the first location, and where the size of the first version is above the threshold size, the first location is one of multiple locations of the persistent storage each storing a respective version of the access control information, and the method further comprises the DMA engine updating location information of the persistent storage, including the DMA engine replacing an indication of a second location of the multiple locations with an indication of the first location.

In another implementation, a system comprises a host including a memory controller, an PCIe interconnect, and a solid state drive (SSD) device coupled to the memory controller via the PCIe interconnect. The SSD device includes a hardware interface to couple the SSD to a host including a memory controller, a non-volatile memory array, and access logic including first circuitry configured to receive from the host configuration information including memory map information identifying a portion of a write-in-place non-volatile memory of the host, the portion allocated to the SSD. The access logic further includes second circuitry configured to write address conversion information to the write-in-place non-volatile memory based on the memory map information, the address conversion information identifying a correspondence of a logical address to a physical address associated with a first location of the non-volatile memory array, wherein the access logic to provide the host with access to the non-volatile memory array based on the address conversion information.

In an embodiment, based on the configuration information, the access logic is further to signal that a flush operation request is to be generated, wherein, in response to the flush operation request, at least a portion of the address conversion information is flushed to the write-in-place non-volatile memory from a cacheline or a buffer. In another embodiment, the access logic includes a direct memory access (DMA) engine to generate the flush operation request. In another embodiment, the access logic to signal that the flush operation request is to be generated includes the access logic to signal a processor of the host to issue a PCOMMIT command. In another embodiment, the access logic includes a direct memory access (DMA) engine to perform a direct memory access of the write-in-place non-volatile memory, the direct memory access to exchange at least a portion of the address conversion information. In another embodiment, the DMA engine is further to automatically retrieve the address conversion information from the persistent store in response to a power up of the SSD. In another embodiment, the write-in-place non-volatile memory includes a byte-addressable memory region. In another embodiment, the write-in-place non-volatile memory supports a write-in-place functionality.

In another embodiment, the access logic is to provide the host with the access to the non-volatile memory array includes the access logic to execute firmware, and the access logic is further to exchange with the persistent storage at least a portion of an image of the firmware. In another embodiment, the access logic is further to exchange with the persistent storage information identifying one or more defective locations of the non-volatile memory array. In another embodiment, the access logic is to provide the host with the access to the non-volatile memory array includes the access logic to execute firmware, and the access logic is further to exchange with the persistent storage information identifying respective values of one or more configurable parameters specific to a version of the firmware. In another embodiment, the access logic further comprises one or more transfer buffers, wherein the access logic is further to exchange with the persistent storage data stored by the one or more transfer buffers. In another embodiment, the access logic is to perform an evaluation of a size of a first version of access control information, and wherein the access logic includes a direct memory access (DMA) engine to write the first version to a first location of the persistent storage, wherein, where the size of the first version is below the threshold size, storage of any version of the access control information to the write-in-place non-volatile memory includes storage to the first location, and where the size of the first version is above the threshold size, the first location is one of multiple locations of the persistent storage each to store a respective version of the access control information, and the DMA engine is to further update location information of the persistent storage, including the DMA engine to replace an indication of a second location of the multiple locations with an indication of the first location.

In another implementation, one or more non-transitory computer-readable storage media have stored thereon instructions which, when executed by one or more processors, cause a solid state drive (SSD) to perform a method comprising receiving configuration information from a host including a memory controller, the configuration information including memory map information identifying a portion of a write-in-place non-volatile memory of the host, the portion allocated to the SSD, based on the memory map information, writing address conversion information to the write-in-place non-volatile memory, the address conversion information identifying a correspondence of a logical address to a physical address associated with a first location of the non-volatile memory array, and based on the address conversion information, providing the host with access to a non-volatile memory array of the SSD.

In another embodiment, the method further comprises, based on the configuration information, signaling that a flush operation request is to be generated, wherein, in response to the flush operation request, at least a portion of the address conversion information is flushed to the write-in-place non-volatile memory from a cacheline or a buffer. In another embodiment, a direct memory access (DMA) engine of the SSD generates the flush operation request. In another embodiment, signaling that the flush operation request is to be generated includes the SSD signaling a processor of the host to issue a PCOMMIT command. In another embodiment, a direct memory access (DMA) engine of the SSD performs a direct memory access of the write-in-place non-volatile memory, the direct memory access to exchange at least a portion of the address conversion information. In another embodiment, method further comprises, with the DMA engine, automatically retrieving the address conversion information from the persistent store in response to a power up of the SSD. In another embodiment, the write-in-place non-volatile memory includes a byte-addressable memory region. In another embodiment, the write-in-place non-volatile memory supports a write-in-place functionality.

In another embodiment, providing the host with access to the non-volatile memory array includes executing firmware at the SSD, and the method further comprises exchanging with the persistent storage at least a portion of an image of the firmware. In another embodiment, the method further comprises exchanging with the persistent storage information identifying one or more defective locations of the non-volatile memory array. In another embodiment, providing the host with access to the non-volatile memory array includes executing firmware at the SSD, and the method further comprises exchanging with the persistent storage information identifying respective values of one or more configurable parameters specific to a version of the firmware. In another embodiment, the method further comprises exchanging with the persistent storage data stored by one or more transfer buffers of the SSD. In another embodiment, the method further comprises performing an evaluation of a size of a first version of access control information, and with a direct memory access (DMA) of the SSD, writing the first version to a first location of the persistent storage, wherein, where the size of the first version is below the threshold size, storing of any version of the access control information to the write-in-place non-volatile memory includes storing to the first location, and where the size of the first version is above the threshold size, the first location is one of multiple locations of the persistent storage each storing a respective version of the access control information, and the method further comprises the DMA engine updating location information of the persistent storage, including the DMA engine replacing an indication of a second location of the multiple locations with an indication of the first location.

Techniques and architectures for supporting operation of a solid state drive are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A solid state drive (SSD) device comprising:
a hardware interface to couple the SSD to a host, the host comprising a memory controller;
a non-volatile memory array;
access logic and a direct memory access (DMA) engine, the access logic to receive configuration information from the host comprising memory map information to identify a portion of a write-in-place non-volatile memory of the host, the portion allocated to the SSD, the DMA engine to receive access control information from the portion of the write-in-place non-volatile memory based on the memory map information;
wherein, the access control information comprises address conversion information identifying a correspondence of a logical address to a physical address associated with the non-volatile memory array, the access logic to provide the host with access to the non-volatile memory array based on the address conversion information; and,
wherein the DMA engine is to support an operation in which the access control information within the SSD is written to the portion of the write-in-place non-volatile memory and the SSD is to initiate a flush request to the host to ensure that the access control information is written to the portion of the write-in-place non-volatile memory from a cache, buffer, and/or other repository of the host.

2. The SSD device of claim 1, wherein the DMA engine is further to automatically retrieve the address conversion information from the write-in-place non-volatile memory in response to detection of a power up of the SSD.

3. The SSD device of claim 1, wherein the write-in-place non-volatile memory includes a byte-addressable memory region.

4. The SSD device of claim 1, wherein the access logic is to execute firmware, and wherein the access logic is further to exchange with a persistent storage at least a portion of an image of the firmware.

5. The SSD device of claim 1, wherein the access logic is to exchange with a persistent storage information identifying one or more defective locations of the non-volatile memory array.

6. The SSD device of claim 1, wherein the access logic is to execute firmware, and wherein the access logic is further to exchange with a persistent storage information identifying respective values of one or more configurable parameters specific to a version of the firmware.

7. The SSD device of claim 1, wherein the access logic further comprises one or more transfer buffers, wherein the access logic is further to exchange with a persistent storage data stored by the one or more transfer buffers.

8. A method performed by a solid state drive (SSD) when the SSD is coupled to a host, the method comprising:
receiving configuration information from the host, the host including a memory controller, the configuration information including memory map information identifying a portion of a write-in-place non-volatile memory of the host, the portion allocated to the SSD;
based on the memory map information, receiving access control information from the write-in-place non-volatile memory by way of a first direct memory access, the access control information comprising address conversion information identifying a correspondence of a logical address to a physical address associated with a non-volatile memory array of the SSD;
based on the address conversion information, providing the host with access to the non-volatile memory array of the SSD;
transferring the access control information within the SSD to the portion of the write-in-pace non-volatile memory by way of a direct memory access operation; and,
initiating a flush request to the host to ensure that the access control information is written to the portion of the write-in-place non-volatile memory from a cache, buffer, and/or other repository of the host.

9. The method of claim 8, wherein the write-in-place non-volatile memory includes a byte-addressable memory region.

10. A system, comprising:
a host including a controller;
an PCIe interconnect; and
a solid state drive (SSD) device coupled to the controller via the PCIe interconnect, the SSD device including:
a hardware interface coupled to the PCIe interconnect;
a non-volatile memory array; and
access logic and a direct memory access (DMA) engine, the access logic to receive configuration information from the host comprising memory map information to identify a portion of a write-in-place non-volatile memory of the host, the portion allocated to the SSD, the DMA engine to receive access control information from the portion of the write-in-place non-volatile memory based on the memory map information;
wherein, the access control information comprises address conversion information identifying a correspondence of a logical address to a physical address associated with the non-volatile memory array, the access logic to provide the host with access to the non-volatile memory array based on the address conversion information; and, wherein the DMA engine is to support an operation in which the access control information within the SSD is written to the portion of the write-in-place non-volatile memory and the SSD is to initiate a flush request to the host to ensure that the access control information is written to the portion of the write-in-place non-volatile memory from a cache, buffer, and/or other repository of the host.

11. One or more non-transitory computer-readable storage media having stored thereon instructions which, when executed by one or more processors, cause a solid state drive (SSD) to perform a method comprising:

receiving configuration information from a host, the host including a memory controller, the configuration information including memory map information identifying a portion of a write-in-place non-volatile memory of the host, the portion allocated to the SSD;

based on the memory map information, receiving access control information from the write-in-place non-volatile memory by way of a first direct memory access, the access control information comprising address conversion information identifying a correspondence of a logical address to a physical address associated with a non-volatile memory array of the SSD;

based on the address conversion information, providing the host with access to the non-volatile memory array of the SSD; and, transferring the access control information within the SSD to the portion of the write-in-pace non-volatile memory by way of a direct memory access operation; and, initiating a flush request to the host to ensure that the access control information is written to the portion of the write-in-place non-volatile memory from a cache, buffer, and/or other repository of the host.

* * * * *